(12) United States Patent
Kimura

(10) Patent No.: US 8,425,851 B2
(45) Date of Patent: Apr. 23, 2013

(54) EXHAUST EMISSION CONTROL DEVICE

(75) Inventor: Masahiro Kimura, Hino (JP)

(73) Assignee: Hino Motors, Ltd., Tokyo (JP)

( * ) Notice: Subject to any disclaimer, the term of this patent is extended or adjusted under 35 U.S.C. 154(b) by 402 days.

(21) Appl. No.: 12/674,106

(22) PCT Filed: Aug. 27, 2008

(86) PCT No.: PCT/JP2008/002320
§ 371 (c)(1),
(2), (4) Date: Feb. 18, 2010

(87) PCT Pub. No.: WO2009/028179
PCT Pub. Date: Mar. 5, 2009

(65) Prior Publication Data
US 2011/0041485 A1    Feb. 24, 2011

(30) Foreign Application Priority Data

Aug. 31, 2007   (JP) .................. 2007-225384

(51) Int. Cl.
*B01D 50/00*    (2006.01)
(52) U.S. Cl.
USPC .......................................... 422/177; 422/180
(58) Field of Classification Search .................. 422/177, 422/180; 248/201
See application file for complete search history.

(56) References Cited

U.S. PATENT DOCUMENTS

| | | | |
|---|---|---|---|
| 5,649,685 A * | 7/1997 | Keller | 248/638 |
| 2010/0223916 A1* | 9/2010 | Hayashi et al. | 60/295 |

FOREIGN PATENT DOCUMENTS

| | | |
|---|---|---|
| CN | 1070984 A | 4/1993 |
| DE | 20 2006 012 530 U1 | 12/2006 |
| JP | 6 63818 | 9/1994 |
| JP | 2002 195027 | 7/2002 |
| JP | 2003-56336 | 2/2003 |
| JP | 2005 155404 | 6/2005 |
| JP | 2007 40149 | 2/2007 |
| JP | 2007 40224 | 2/2007 |
| JP | 2008 196328 | 8/2008 |
| WO | WO 2009/012819 A1 | 1/2009 |

OTHER PUBLICATIONS

U.S. Appl. No. 12/677,957, filed Mar. 12, 2010, Kowada, et al.
U.S. Appl. No. 12/679,677, filed Mar. 24, 2010, Kowada.
Supplementary Search Report issued Jun. 6, 2011 in Europe Application No. 08 82 8117.
U.S. Appl. No. 12/783,994, filed Apr. 21, 2010, Kowada.
U.S. Appl. No. 12/742,321, filed May 11, 2010, Kowada, et al.

\* cited by examiner

*Primary Examiner* — Tom Duong
(74) *Attorney, Agent, or Firm* — Oblon, Spivak, McClelland, Maier & Neustadt, L.L.P.

(57) ABSTRACT

The invention has its object to provide an exhaust emission control device which can be favorably mounted on a vehicle without causing relative twisting between a particulate filter and a selective reduction catalyst. In the exhaust emission control device in which a particulate filter and a selective reduction catalyst are housed by casings, respectively, and arranged side by side such that inlet ends of the filter and the catalyst are oriented to one and the same direction, an S-shaped communication passage being provided for introduction of the exhaust gas from an outlet end of the filter to an inlet end of the adjacent catalyst through antithetical turnabout, urea water being addible intermediately of the communication passage, the casings for the filter and catalyst are integrally restrained by rigid plates (restraining members).

4 Claims, 4 Drawing Sheets

EXHAUST EMISSION CONTROL DEVICE

TECHNICAL FIELD

The present invention relates to an exhaust emission control device.

BACKGROUND ART

It has been recently proposed that a particulate filter for capturing of particulates in exhaust gas is incorporated in an exhaust pipe and a selective reduction catalyst capable of selectively reacting $NO_x$ with ammonia even in the presence of oxygen is arranged downstream of the particulate filter, urea water as reducing agent being added between the reduction catalyst and the particulate filter, thereby attaining reduction of both the particulates and $NO_x$.

Such addition of the urea water to the selective reduction catalyst is conducted between the particulate filter and the selective reduction catalyst. Thus, in order to ensure sufficient reaction time for pyrolysis of the urea water added to the exhaust gas into ammonia and carbon dioxide gas, it is necessary to prolong a distance between a urea water added position and the selective reduction catalyst. However, such arrangement of the particulate filter and the selective reduction catalyst substantially spaced apart from each other will extremely impair the mountability on a vehicle.

In order to overcome this, a compact, exhaust emission control device as shown in FIG. 1 has been proposed by the applicant as Japanese patent application No. 2007-29923. In the exhaust emission control device shown, incorporated in an exhaust pipe 4 through which exhaust gas 3 flows from a diesel engine 1 via an exhaust manifold 2 is a particulate filter 5 housed in a casing 7 to capture particulates in the exhaust gas 3; arranged downstream of and in parallel with the particulate filter 5 and housed in a casing 8 is a selective reduction catalyst 6 having a property capable of selectively reacting $NO_x$ with ammonia even in the presence of oxygen. An outlet end of the particulate filter 5 is connected to an inlet end of the selective reduction catalyst 6 through an S-shaped communication passage 9 with an upstream urea-water addition means 10 such that the exhaust gas 3 discharged through the outlet end of the particulate filter 5 is antithetically turned about into the inlet end of the adjacent selective reduction catalyst 6.

Arranged in the casing 7 and in front of the particulate filter 5 is an oxidation catalyst 11 for oxidization treatment of unburned fuel in the exhaust gas 3, and arranged in the casing 8 and behind the selective reduction catalyst 6 is an ammonia reducing catalyst 12 for oxidization treatment of surplus ammonia.

With the exhaust emission control device thus constructed, the particulates in the exhaust gas 3 are captured by the particulate filter 5 and, on an upstream side in the communication passage 9, urea water is added by the urea water addition means 10 into the exhaust gas 3 for decomposition into ammonia and carbon dioxide gas and $NO_x$ in the exhaust gas 3 is favorably reduced and depurated by the ammonia on the selective reduction catalyst 6. Thus, attained is reduction of both the particulates and $NO_x$ in the exhaust gas 3.

In this situation, the exhaust gas 3 from the outlet end of the particulate filter 5 is introduced into the inlet end of the adjacent selective reduction catalyst 6 through antithetical turnabout by the communication passage 9, which ensures a long distance between the urea water added position and the selective reduction catalyst 6 and facilitates mixing of the urea water with the exhaust gas 3 due to the antithetical turnabout of and thus turbulence of the exhaust gas flow, resulting in ensuring sufficient reaction time for production of ammonia from the urea water.

Moreover, the particulate filter 5 is arranged in parallel with the selective reduction catalyst 6 and the communication passage 9 is arranged along and between the filter 5 and the catalyst 6, so that the whole structure is compact in size to substantially improve the mountability on a vehicle.

As a prior art literature pertinent to the invention, there is, for example, the following Patent Literature 1.

[Patent Literature 1] JP 2005-155404A

SUMMARY OF INVENTION

Technical Problems

However, with such structure having the heavy particulate filter 5 and heavy selective reduction catalyst 6 arranged side by side and interconnected by the S-shaped communication passage 9, relative twisting tends to be caused between the filter 5 and the catalyst 6 upon mounting of the structure on a vehicle, so that stress may be concentrated to connections and curved portions of the communication passage 9 into breakage.

The invention was made in view of the above and has its object to provide an exhaust emission control device which can be favorably mounted on a vehicle without causing relative twisting between a particulate filter and a selective reduction catalyst.

Solution to Problems

The invention is directed to an exhaust emission control device wherein a particulate filter and a selective reduction catalyst arranged downstream of said particulate filter and capable of selectively reacting $NO_x$ with ammonia even in the presence of oxygen are housed by casings, respectively, and arranged side by side such that inlet ends of the particulate filter and the selective reduction catalyst are oriented to one and the same direction, an S-shaped communication passage being provided for introduction of the exhaust gas from an outlet end of the particulate filter to the inlet end of the adjacent selective reduction catalyst through antithetical turnabout, urea water being addible intermediately of said communication passage, characterized in that the casings for the particulate filter and selective reduction catalyst are integrally restrained by rigid restraining members.

Thus, the particulate filter and selective reduction catalyst are integrally restrained through the casings by the rigid restraining members to cause no relative twisting therebetween, so that prevented upon mounting of the device on a vehicle is breakage due to stress concentration to connections and curved portions of the communication passage which interconnects the particulate filter and the selective reduction catalyst.

Moreover, it is preferable in the invention that the casings for the particulate filter and selective reduction catalyst are individually restrained at a plurality of axial points on the casings by restraining members, said respective restraining members being connected together by connecting members for integral restraint. It is also preferable that the communication passage is also restrained together upon restraining of the casings for the particulate filter and selective reduction catalyst by the restraining members.

Advantageous Effects of Invention

An exhaust emission control device of the invention as mentioned in the above can exert various excellent effects and advantages as mentioned in the below.

(I) The particulate filter and the selective reduction catalyst can be integrally restrained through the casings by the rigid restraining members for prevention of relative twisting therebetween, so that the exhaust emission control device with the particulate filter and the selective reduction catalyst being arranged side by side and interconnected by the S-shaped communication passage can be favorably mounted on a vehicle, and preliminarily prevented is stress concentration to the connections and curved portions of the communication passage upon mounting of the device on a vehicle.

(II) When the casings for the particulate filter and selective reduction catalyst are individually restrained at a plurality of axial positions by the restraining members and the respective restraining members are also integrally restrained by the connecting members together, the particulate filter and selective reduction catalyst can be further stiffly restrained to prevent the relative twisting therebetween in a further reliable manner.

(III) When the communication passage is also restrained together upon restraint of the casings for the particulate filter and selective reduction catalyst by the restraining members, stress concentration to the connection and curved portion of the communication passage can be prevented in a further reliable manner for prevention of breakage.

Figure 1:
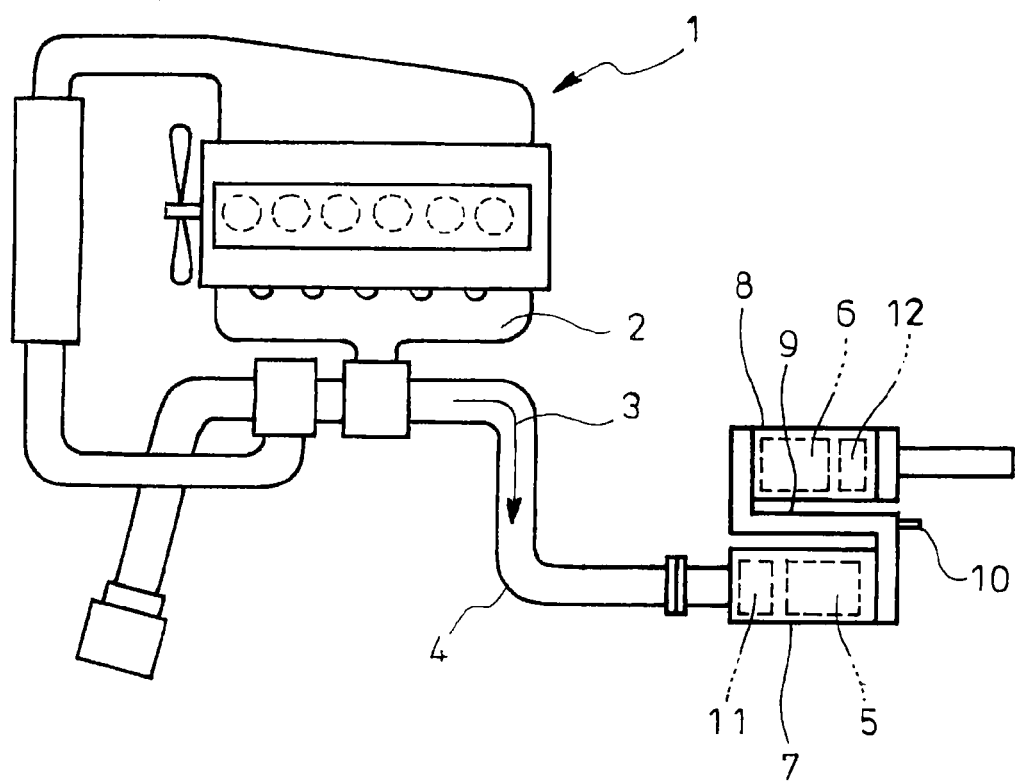
FIG. 1 is a schematic view showing a conventional device.

REFERENCE SIGNS LIST 3 exhaust gas
4 exhaust pipe
5 particulate filter
6 selective reduction catalyst
7 casing
8 casing
9 communication passage
10 urea water adding means
13 plate (restraining member)
14 bracket (restraining member)
16 connecting member

DESCRIPTION OF EMBODIMENTS

Next, embodiments of the invention will be described in conjunction with drawings.

Figure 2:
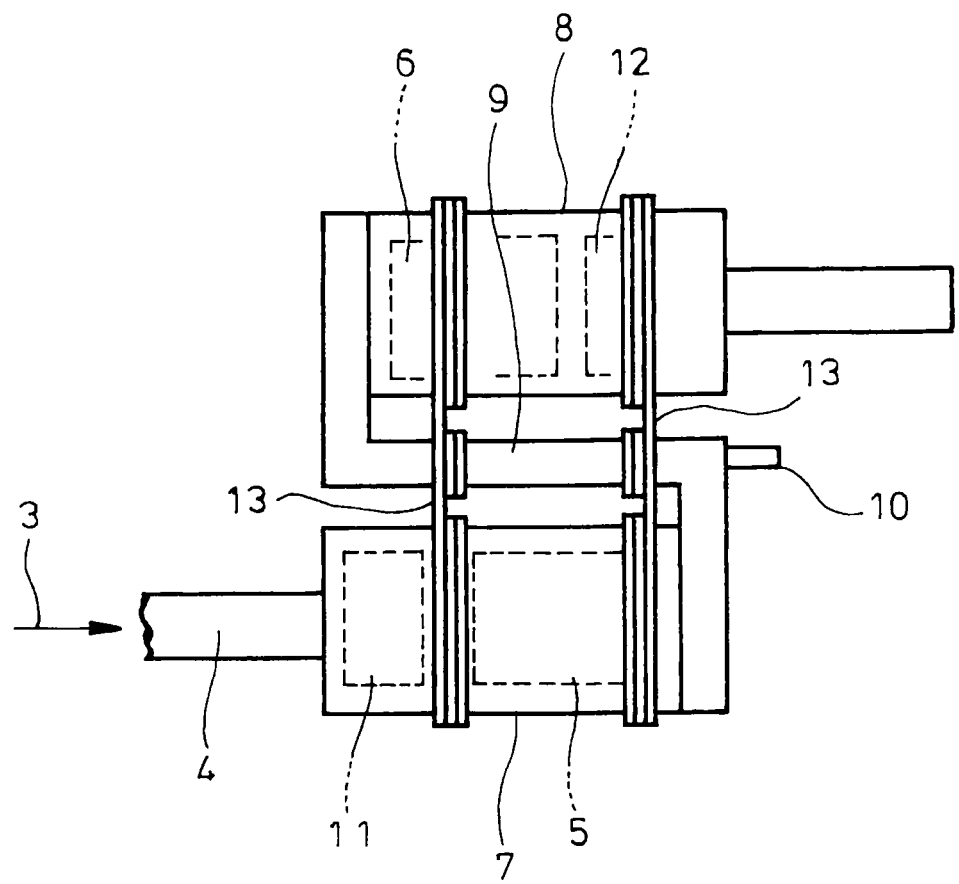
FIG. 2 is a plan view showing an embodiment of the invention.
Figure 3:
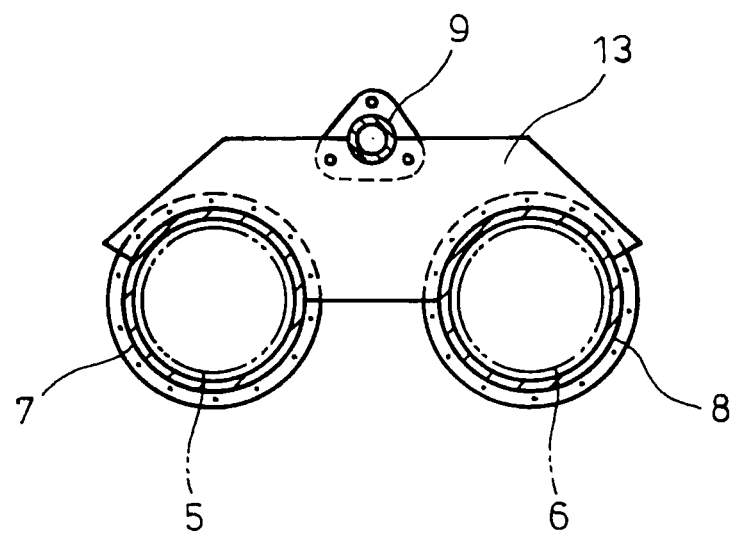
FIG. 3 is a sectional view of the exhaust emission control device shown in FIG. 2 looking axially of the respective casings.

FIGS. 2 and 3 show an embodiment of the invention, FIG. 2 being a plan view of an exhaust emission control device according to the embodiment looking from above, FIG. 3 being a sectional view looking axially of a particulate filter 5 and a selective reduction catalyst 6.

In the embodiment illustrated, just like the conventional device described above in conjunction with FIG. 1, the particulate filter 5 and the selective reduction catalyst 6 are housed by casings 7 and 8, respectively, and are arranged side by side such that respective inlet ends are orientated to one and the same direction. An S-shaped communication passage 9 is provided so as to introduce exhaust gas 3 discharged through an outlet end of the particulate filter 5 into an inlet end of the adjacent selective reduction catalyst 6 through antithetical turnabout of the exhaust gas 3, urea water being addible by urea water adding means 10 intermediately of the communication passage 9. The casings 7 and 8 for the particulate filter 5 and the selective reduction catalyst 6, respectively, are integrally restrained by rigid plates 13 (restraining members) for prevention of relative twisting therebetween.

Specifically, as shown in FIG. 2, each of the casings 7 and 8 for the particulate filter 5 and selective reduction catalyst 6 in the embodiment is a three-way split structure constituted by three portions detachably connected together at two axial points through flanges. A communication passage 9 between the filter and the catalyst is also a three-way split structure constituted by three longitudinal portions detachably connected together at the same positions through flanges.

As exemplarily shown in FIG. 3 which is a sectional view at one of the split positions and looking axially of the device, the plate 13 is overlapped and bolted together by flange-connecting bolts, at the split position, with upper portions of the flanges of the casings 7 and 8 for the filter 5 and catalyst 6, respectively, and is overlapped and bolted together by flange-connecting bolts with a lower portion of the flange of the communication passage 9.

Thus, in this manner, the casings 7 and 8 for the particulate filter 5 and selective reduction catalyst 6 can be integrally restrained by the solid plates 13 for prevention of relative twisting therebetween, so that the exhaust emission control device with the particulate filter 5 and selective reduction catalyst 6 arranged side by side and connected together through the S-shaped communication passage 9 can be favorably mounted on a vehicle. Breakage upon the mounting due to stress concentration to the connections and curved portions of the communication passage 9 can be preliminarily prevented.

The casings 7 and 8 for the particulate filter 5 and selective reduction catalyst 6 are individually restrained at the plural axial positions by the plates 13, so that the particulate filter 5 and the selective reduction catalyst 6 can be further stiffly restrained and relative twisting therebetween can be further reliably prevented. Furthermore, since the communication passage 9 is also restrained together upon restraint of the particulate filter 5 and the selective reduction catalyst 6 by the plates 13, stress concentration to the connections and curved portions of the communication passage 9 can be further reliably prevented to prevent breakage.

Figure 4:
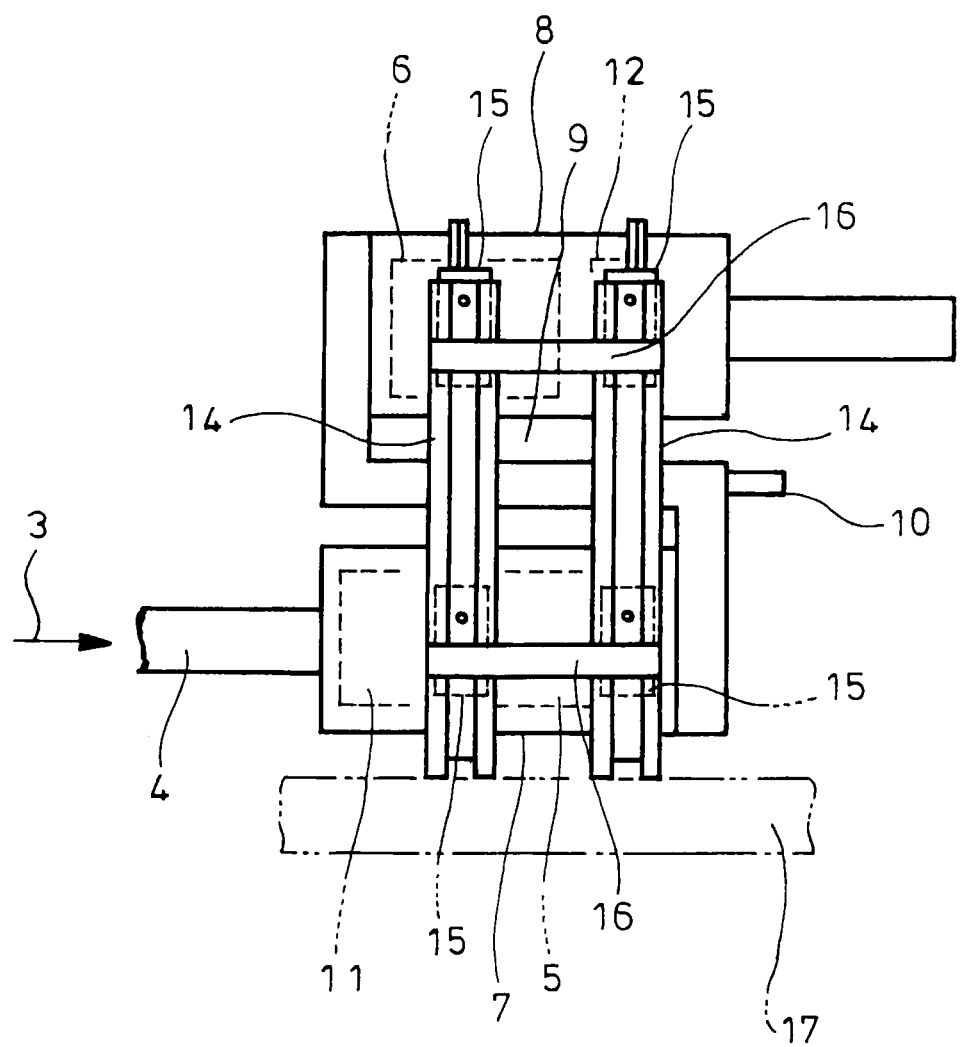
FIG. 4 is a plan view showing a further embodiment of the invention.
Figure 5:
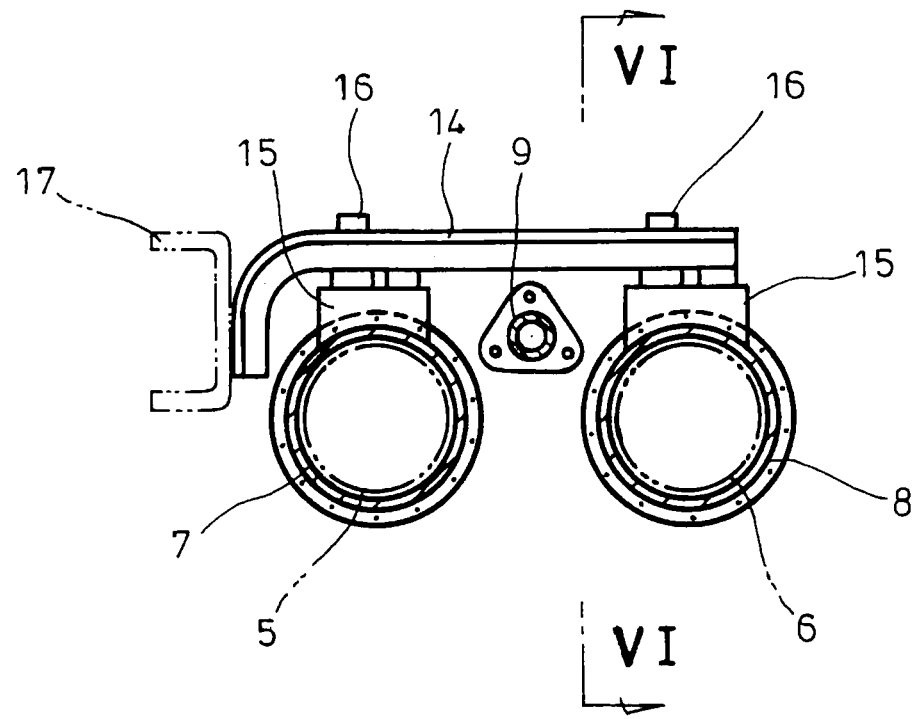
FIG. 5 is a sectional view of the exhaust emission control device shown in FIG. 4 looking axially of the respective casings.
Figure 6:
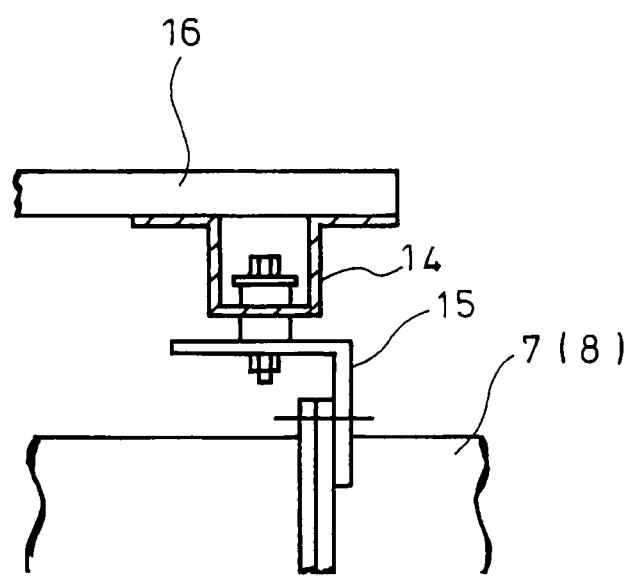
FIG. 6 is a view looking in the direction of arrows VI in FIG. 5.

FIGS. 4-6 show a further embodiment of the invention in which substituted for the plates 13 described above with respect to FIGS. 2 and 3 are a pair of brackets 14 (restraining members) extending sideways of the particulate filter 5 and the selective reduction catalyst 6 (i.e., in a direction perpendicular to axes of them). Upper portions of flanges of the particulate filter 5 and selective reduction catalyst 6 are fixed to lower surfaces of the respective brackets 14 through fixture tools 15, and the respective brackets 14 themselves are also connected together and integrally restrained by connecting members 16 extending axially of the filter 5 and catalyst 6.

As shown in FIG. 6 in enlarged scale, the bracket 14 has a U-shaped cross section. The fixture tools 15 each with an L-shaped cross section are mounted on a bottom of the U-shaped part through fastening tools, and lower ends of the fixture tools 15 are overlapped with upper portions of flanges of the particulate filter 5 and selective reduction catalyst 6 and are bolted together by flange-connecting bolts at the respective overlapped portions.

As shown in FIG. 5, one end of the bracket 14 is downwardly curved in the form of letter L, which part is fitted to an outer side surface of a frame 17 of a vehicle so as to serve also as a support member for the exhaust emission control device.

Thus, also in this case, the particulate filter 5 and selective reduction catalyst 6 are integrally restrained through the casings 7 and 8 by the rigid brackets 14 for prevention of relative twisting therebetween. As a result, the exhaust emission control device with the particulate filter 5 and selective reduction catalyst 6 arranged side by side and interconnected through the S-shaped communication passage 9 can be favorably mounted on a vehicle; upon the mounting, breakage due to stress concentration to the connectors and curved portions of the communication passage 9 can be preliminarily prevented.

The particulate filter 5 and the selective reduction catalyst 6 are individually restrained through the casings 7 and 8 at the plural axial positions by the brackets 14, and the respective brackets 14 themselves are also connected together and integrally restrained by the connecting members 16, so that the particulate filter 5 and selective reduction catalyst 6 can be further stiffly restrained and relative twisting between them can be further reliably prevented.

It is to be understood that an exhaust emission control device of the invention is not limited to the above embodiments and that various changes and modifications may be made without departing from the scope of the invention.

The invention claimed is:

1. An exhaust emission control device, comprising:
a particulate filter housed by a casing;
a selective reduction catalyst housed by a casing and arranged downstream of said particulate filter and capable of selectively reacting $NO_x$ with ammonia even in the presence of oxygen, the particulate filter and the selective reduction catalyst are arranged side by side such that inlet ends of the particulate filter and the selective reduction catalyst are oriented to one and the same direction; and
an S-shaped communication passage being provided independently between the particulate filter and the selective reduction catalyst and configured to guide the exhaust gas from an outlet end of the particulate filter to the inlet end of the adjacent selective reduction catalyst through antithetical turnabout, urea water being addible intermediately of said communication passage,
wherein the S-shaped communication passage and each of the casings for the particulate filter and selective reduction catalyst are interconnected and integrally restrained so as to be shackled by rigid restraining members.

2. An exhaust emission control device as claimed in claim 1, wherein the casings for the particulate filter and selective reduction catalyst are individually restrained at a plurality of axial points on the casings by the restraining members, said respective restraining members being connected together by connecting members for integral restraint.

3. An exhaust emission control device as claimed in claim 2, wherein a plurality of axial points along the communication passage are restrained together by the restraining members.

4. An exhaust emission control device as claimed in claim 1, wherein a plurality of axial points along the communication passage are restrained together by the restraining members.

* * * * *